(12) United States Patent
Li et al.

(10) Patent No.: US 12,318,750 B2
(45) Date of Patent: Jun. 3, 2025

(54) CONTINUOUS PRODUCTION DEVICE FOR ORGANOPHOSPHORUS NITRILE-CATALYZED HIGH-MOLECULAR-WEIGHT POLYSILOXANE

(71) Applicant: Qingdao University of Science and Technology, Shandong (CN)

(72) Inventors: Zhibo Li, Shandong (CN); Yuetao Liu, Shandong (CN); Na Zhao, Shandong (CN)

(73) Assignee: Qingdao University of Science and Technology, Qingdao (CN)

( * ) Notice: Subject to any disclaimer, the term of this patent is extended or adjusted under 35 U.S.C. 154(b) by 0 days.

(21) Appl. No.: 18/827,839

(22) Filed: Sep. 8, 2024

(65) Prior Publication Data

US 2025/0001388 A1     Jan. 2, 2025

Related U.S. Application Data

(63) Continuation of application No. PCT/CN2023/096318, filed on May 25, 2023.

(30) Foreign Application Priority Data

Sep. 13, 2022   (CN) .......................... 202211109367.8

(51) Int. Cl.
   *B01J 19/20*     (2006.01)
   *B01J 19/00*     (2006.01)
   (Continued)

(52) U.S. Cl.
   CPC ........... *B01J 19/20* (2013.01); *B01J 19/0013* (2013.01); *B01J 19/0066* (2013.01); *B01J 19/06* (2013.01);
   (Continued)

(58) Field of Classification Search
   CPC .... B01J 19/00; B01J 19/0006; B01J 19/0013; B01J 19/0053; B01J 19/0066; B01J 19/06;
   (Continued)

(56) References Cited

U.S. PATENT DOCUMENTS

| 3,655,850 | A | 4/1972 | Woodham et al. |
| 5,540,900 | A | 7/1996 | Poncet |

(Continued)

FOREIGN PATENT DOCUMENTS

| CN | 1113923 C | 7/2003 |
| CN | 101824151 A | 9/2010 |

(Continued)

OTHER PUBLICATIONS

Machine translation of CN 111574714 A, which was published on Aug. 25, 2020 and included in IDS filed on Dec. 20, 2024 (Year: 2020).*

(Continued)

*Primary Examiner* — Natasha E Young

(57) ABSTRACT

This disclosure belongs to the field of organic silicon polymer material preparation, particularly relating to a continuous production device for organophosphorus nitrile-catalyzed high-molecular-weight polysiloxane. It includes a reaction device with a horizontal configuration and dual-axis stirring, where the diameters of the dual axes decrease gradually from the feed port to the discharge outlet, and the corresponding nominal diameters of the paddles increase gradually from the feed port to the discharge outlet. The stirring shaft and paddles are hollow and can be externally heated or cooled. The dual-axis engagement provides mass transfer, heat transfer, and axial propelling force. This reaction device exhibits excellent mass transfer and heat transfer effects, resulting in uniform products with narrow molecular (Continued)

weight distribution and low volatile content. It is particularly suitable for the continuous production of high-viscosity, high-molecular-weight polysiloxanes catalyzed by organophosphorus nitrile. This production device can be adapted to various traditional chemical reaction equipment.

3 Claims, 1 Drawing Sheet

(51) Int. Cl.
    *B01J 19/06*     (2006.01)
    *C08G 77/08*     (2006.01)

(52) U.S. Cl.
    CPC ..... *C08G 77/08* (2013.01); *B01J 2219/00076* (2013.01)

(58) Field of Classification Search
    CPC ........ B01J 19/18; B01J 19/20; B01J 2219/00; B01J 2219/00049; B01J 2219/00051; B01J 2219/00074; B01J 2219/00076; C08G 77/00; C08G 77/04; C08G 77/06; C08G 77/08

See application file for complete search history.

(56) References Cited

U.S. PATENT DOCUMENTS

| | | | |
|---|---|---|---|
| 7,469,629 B2 * | 12/2008 | Fava | ........... B01F 35/71775 99/472 |
| 2006/0182866 A1 | 8/2006 | Fava et al. | |

FOREIGN PATENT DOCUMENTS

| | | |
|---|---|---|
| CN | 102225997 A | 10/2011 |
| CN | 109836582 A | 6/2019 |
| CN | 110314759 A | 10/2019 |
| CN | 110575780 A | 12/2019 |
| CN | 111036143 A | 4/2020 |
| CN | 111574714 A | 8/2020 |
| CN | 113527665 A | 10/2021 |
| FR | 2204446 A1 | 5/1974 |
| JP | 2000198926 A | 7/2000 |
| JP | 2005138919 A | 6/2005 |
| KR | 20050115155 A | 12/2005 |
| SU | 1138100 A1 | 2/1985 |

OTHER PUBLICATIONS

Notice of Allowance of counterpart Chinese Patent Application No. 202211109367.8 issued on Mar. 4, 2024.
1st Office Action of counterpart Chinese Patent Application No. 202211109367.8 issued on Dec. 1, 2023.
International Search Report of PCT Patent Application No. PCT/CN2023/096318 issued on Sep. 8, 2023.

* cited by examiner

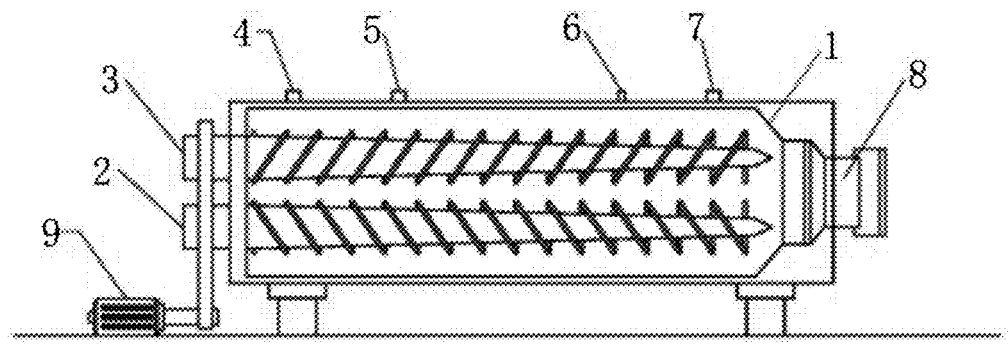

CONTINUOUS PRODUCTION DEVICE FOR ORGANOPHOSPHORUS NITRILE-CATALYZED HIGH-MOLECULAR-WEIGHT POLYSILOXANE

CROSS REFERENCE TO RELATED APPLICATIONS

The present application is a Continuation Application of PCT Application No. PCT/CN2023/096318, now WO 2024/055630, filed on May 25, 2023, which claims the benefit of Chinese Patent Application No. 202211109367.8 filed on Sep. 13, 2022. All the above are hereby incorporated by reference in their entirety.

TECHNICAL FIELD

This disclosure pertains to the field of organic silicon polymer material preparation technology, specifically involving a continuous production device for high-molecular-weight polysiloxane.

BACKGROUND ART

The information disclosed in this background section is solely intended to enhance the overall understanding of the disclosure's context and should not necessarily be construed as acknowledging or implying that this information constitutes prior art known to those skilled in the art.

Organic silicon materials with Si—O main chain structures exhibit excellent properties such as high and low-temperature resistance, radiation resistance, oxidation resistance, weather resistance, hydrophobicity, and physiological inertness. They have been widely used in various fields such as electronics, chemicals, metallurgy, construction, aerospace, aviation, and medical materials. Polysiloxanes, as the matrix material of organic silicon, exhibit better mechanical properties with increasing molecular weight and viscosity. Moreover, the synthesis of high-molecular-weight polysiloxanes typically involves the anionic ring-opening polymerization of cyclic siloxanes. The increase in viscosity during the polymerization process poses challenges in mass transfer, heat transfer, and affects the polymer's uniformity, molecular weight distribution, and volatile content. Particularly in organophosphorus nitrile-catalyzed systems, due to their high ring-opening activity and rapid polymerization rates, the system's viscosity can rapidly increase, imposing more stringent requirements on mass transfer and heat transfer in the polymerization reactor. Traditional methods for synthesizing high-molecular-weight polysiloxanes typically use polymerization reactors in batch or semi-batch operations to ensure adequate mass transfer and heat transfer in the system, resulting in a uniform molecular weight distribution of the product. For instance, Patent CN102225997A utilizes a multi-layer paddle stirrer and scraper in a polymerization reactor to synthesize high-molecular-weight polysiloxanes, Patent CN101824151A employs an extrusion synthesis method for high-molecular-weight polysiloxanes, and Patent CN109836582A uses kneaders or twin-screw mixers as polymerization reactors to prepare high-molecular-weight polysiloxanes. While these methods address mass transfer and heat transfer issues during the polymerization of high-molecular-weight polysiloxanes, they are batch processes and cannot achieve continuous production. Patent CN1113923C discloses a continuous polymerization reactor for preparing high-molecular-weight polysiloxanes by serially connecting two or more SV-type static mixers with gradually increasing diameters. Although this method enables continuous production of high-molecular-weight polysiloxanes, the reactor itself lacks moving parts and relies solely on the special structure of the units and fluid movement, which may not achieve optimal mass transfer and heat transfer, especially for high-viscosity systems in the later stages of the reaction.

SUMMARY OF THE DISCLOSURE

To overcome the aforementioned issues, the present disclosure provides a continuous production device for organophosphorus nitrile-catalyzed high-molecular-weight polysiloxanes. It employs a horizontal configuration with dual-axis stirring, where the diameters of the dual axes decrease gradually from the feed port to the discharge outlet, and the corresponding nominal diameters of the paddles increase gradually from the feed port to the discharge outlet. The engagement of the dual axes provides mass transfer, heat transfer, and axial propelling force. This device, as a polymerization reactor, is suitable for the continuous production of high-molecular-weight polysiloxanes catalyzed by organophosphorus nitrile, offering good mass transfer and heat transfer effects, resulting in uniform products with narrow molecular weight distribution and low volatile content. Additionally, this device can serve as a neutralization and devolatilization reactor for high-molecular-weight polysiloxanes, with good performance. The device is also suitable for the compounding process of all high-viscosity, highly elastomeric materials and can be matched with various traditional chemical reactors such as extrusion, drying, granulation, etc., making it easy to implement.

To achieve the above objectives, the present disclosure adopts the following technical solutions:

The first aspect of the present disclosure provides a continuous production device for organophosphorus nitrile-catalyzed high-molecular-weight polysiloxanes, including: a casing 1 with twin screws 2, 3 inside, multiple feed ports 4, 5, 7 and a vacuum interface 6 at the top of the casing 1, and a discharge outlet 8 on one side of the casing 1.

Advantages of the Disclosure (1) Compared to the prior art, the continuous production device for high-molecular-weight polysiloxanes in this disclosure features paddles with increasing nominal diameters from the feed port to the discharge outlet. As the polymerization reaction system's viscosity increases with longer residence time, high-viscosity materials correspond to larger paddle nominal diameters. Therefore, this reaction device exhibits excellent mass transfer and heat transfer effects, resulting in uniform products with narrow molecular weight distribution and low volatile content, especially suitable for the continuous production of high-viscosity, high-molecular-weight polysiloxanes.

(2) Compared to the prior art, the continuous polymerization device in this disclosure can be adapted to the production process of high-activity organophosphorus nitrile-catalyzed high-molecular-weight polysiloxanes and can also be matched with various traditional chemical reaction equipment such as extrusion, desliming, neutralization, drying, granulation, etc., making it easy to implement.

(3) The structure of the device in this disclosure is simple, easy to operate, practical, and easy to implement.

DESCRIPTION OF THE DRAWINGS

The accompanying drawings, which form part of this specification, are provided to further understand the disclosure. The exemplary embodiments and their descriptions are used to explain the disclosure and do not constitute improper limitations on the disclosure.

The sole FIGURE is a schematic diagram of the structure of a continuous production device for organophosphorus nitrile-catalyzed high-molecular-weight polysiloxanes.

REFERENCE NUMERALS

1—casing; 2, 3—twin screws; 4, 5, 7—feed ports; 6—vacuum interface; 8—discharge outlet; and 9—motor.

DETAILED DESCRIPTION OF EMBODIMENTS

It should be noted that the following detailed descriptions are exemplary and aim to provide further explanation of the disclosure. Unless otherwise specified, all technical and scientific terms used in this disclosure have the same meanings as understood by those skilled in the art of the disclosure.

As introduced in the background, current batch polymerization reactors for high-viscosity, high-molecular-weight polysiloxanes exhibit poor mass transfer and heat transfer effects, resulting in non-uniform products with wide molecular weight distributions and high volatile content. To address this, the present disclosure proposes a continuous production device for organophosphorus nitrile-catalyzed high-molecular-weight polysiloxanes, utilizing a horizontal configuration with dual-axis stirring. The diameters of the dual axes decrease gradually from the feed port to the discharge outlet, while the corresponding nominal diameters of the paddles increase gradually from the feed port to the discharge outlet. The gradual increase in paddle diameter corresponds to the increasing axial viscosity distribution in the system, facilitating better mass transfer and heat transfer effects. Therefore, the products obtained by this reaction device are uniform, with narrow molecular weight distributions and low volatile content, making it particularly suitable for the continuous production of high-viscosity, high-molecular-weight polysiloxanes. Additionally, this device can be matched with various traditional chemical reaction equipment such as extrusion, desliming, neutralization, drying, granulation, etc., making it easy to implement.

Specifically:

A continuous production device for organophosphorus nitrile-catalyzed high-molecular-weight polysiloxanes. It utilizes a horizontal configuration with dual-axis stirring, where the diameters of the dual axes decrease gradually from the feed port to the discharge outlet, and the corresponding nominal diameters of the paddles increase gradually from the feed port to the discharge outlet. The stirring shaft and paddles are hollow and can be externally heated or cooled, providing mass transfer, heat transfer, and axial propelling force through dual-axis engagement.

The present disclosure primarily focuses on a continuous polymerization device, where the simultaneous variation in the diameters of the dual axes and the nominal diameters of the paddles aims to enhance mass transfer, heat transfer, and ensure uniform polymerization, resulting in a more homogeneous product. As the reaction progresses, the viscosity distribution of the product along the axis increases, and the increasing paddle diameter is more conducive to uniform polymerization and reduced volatile content.

The diameters of the dual axes and paddle nominal diameters are not specifically limited and can be designed based on the production capacity of the device or the size of the reactor casing. The size to some extent indicates the production capacity of the continuous polymerization device. A larger paddle nominal diameter corresponds to a higher production capacity.

It has been found that the continuous production device for organophosphorus nitrile-catalyzed high-molecular-weight polysiloxanes in this disclosure is not limited to specific types of polysiloxanes and can be applied to the continuous production process of all high-viscosity, high-molecular-weight polysiloxanes.

Additionally, it has been found that the continuous production device for organophosphorus nitrile-catalyzed high-molecular-weight polysiloxanes in this disclosure is not limited to specific types of organophosphorus nitriles and can include one or more organophosphorus nitrile compounds having high-ring-opening activity.

The continuous production device for organophosphorus nitrile-catalyzed high-molecular-weight polysiloxanes does not specify the working volume of the reactor or the process residence time, but the diameter of the casing 1 needs to match the nominal diameter of the paddles, and the residence time needs to match the stirring shaft speed.

In some embodiments, the continuous production device for organophosphorus nitrile-catalyzed high-molecular-weight polysiloxanes features dual axes with decreasing diameters from the feed port to the discharge outlet, with no specific limitation on the length of the dual axes, which can be designed based on the working volume of the reactor.

In some embodiments, the continuous production device for organophosphorus nitrile-catalyzed high-molecular-weight polysiloxanes features paddle nominal diameters increasing from the feed port to the discharge outlet, where the paddle nominal diameter needs to match the internal diameter of the reactor, and various paddle shapes providing axial propelling force are suitable.

Currently, the production processes for high-molecular-weight polysiloxanes are semi-batch methods, where there is always a neutralization and devolatilization process after polymerization. The continuous production process of this disclosure, utilizing organophosphorus nitrile catalysis, involves fewer side reactions during polymerization, resulting in lower residual monomer or small molecule content in the later stages, eliminating the need for devolatilization steps. Therefore, it can be applied to the continuous production of high-molecular-weight polysiloxanes using the device described in this application. In some embodiments, the continuous production device for organophosphorus nitrile-catalyzed high-molecular-weight polysiloxanes features hollow reactor casings, stirring shafts, and paddles that can be externally heated or cooled.

In some embodiments, the continuous production device for organophosphorus nitrile-catalyzed high-molecular-weight polysiloxanes utilizes dual-axis engagement to provide mass transfer, heat transfer, and axial propelling force to achieve continuous production.

In some embodiments, the continuous production device for organophosphorus nitrile-catalyzed high-molecular-weight polysiloxanes can be matched with various traditional chemical reactors such as extrusion, desliming, neutralization, drying, granulation, etc.

In some embodiments, the viscosity range of the materials is: 5-200,000 Pa·s.

In some embodiments, the operating temperature is: −50-300° C.

In some embodiments, the reaction residence time is 0.1 to 5 hours.

In some embodiments, the operating pressure range is −200 Pa to 1.0 MPa.

It has been found that unlike traditional batch polymerization reactors, the continuous production device in this disclosure exhibits excellent mass transfer and heat transfer effects, resulting in uniform products with narrow molecular weight distributions and low volatile content, suitable for the continuous production of high-viscosity, high-molecular-weight polysiloxanes.

Further detailed explanations of the disclosure will be provided in the following specific examples. It should be noted that these specific examples are explanatory and not limiting to the disclosure.

Embodiment 1

A continuous production device for organophosphorus nitrile-catalyzed high-molecular-weight polysiloxanes, as illustrated in the sole FIGURE, includes: a casing 1 with twin screws 2, 3 inside, multiple feed ports 4, 5, 7, a vacuum interface 6 at the top of the casing 1, and a discharge outlet 8 on one side of the casing 1.

Operating method: Introduce cyclic siloxane materials, organophosphorus nitrile catalyst, and other additives separately through different feed ports into the casing 1, start the motor, control the speed of the twin screws (the screw speed can be continuously adjusted, with a minimum and maximum speed, currently reaching speeds of over 1000 r/min. The higher the speed, the greater the shear force and production yield), start the vacuum interface switch, adjust the pressure to −200 Pa to 1.0 MPa, control the twin screw speed and vacuum level to control the material's residence time in the reactor for 0.1 to 5 hours, maintain a working temperature of −50 to 300° C. for continuous polymerization, and discharge the product.

Embodiment 2

A continuous production device for organophosphorus nitrile-catalyzed high-molecular-weight polysiloxanes, as illustrated in the sole FIGURE, includes: a casing 1 with twin screws 2, 3 inside, multiple feed ports 4, 5, 7, a vacuum interface 6 at the top of the casing 1, and a discharge outlet 8 on one side of the casing 1.

The diameters of the twin axes decrease gradually from the feed port to the discharge outlet, and the corresponding nominal diameters of the paddles increase from the feed port to the discharge outlet.

Embodiment 3

A continuous production device for organophosphorus nitrile-catalyzed high-molecular-weight polysiloxane, as illustrated in the sole FIGURE, includes: a casing 1, within which there are twin screws 2, 3, multiple feed ports 4, 5, 7, and a vacuum interface 6 at the top of the casing 1, and a discharge outlet 8 on one side of the casing 1.

The twin screws 2, 3 are arranged parallel and meshed on dual shafts.

Embodiment 4

A continuous production device for organophosphorus nitrile-catalyzed high-molecular-weight polysiloxane, as illustrated in the sole FIGURE, including: a casing 1, within which there are twin screws 2, 3, multiple feed ports 4, 5, 7, and a vacuum interface 6 at the top of the casing 1, and a discharge outlet 8 on one side of the casing 1.

The screws 2/3 are composed of stirring shafts and propellers with spiral blades.

Embodiment 5

A continuous production device for organophosphorus nitrile-catalyzed high-molecular-weight polysiloxane, as illustrated in the sole FIGURE, including: a casing 1, within which there are twin screws 2, 3, multiple feed ports 4, 5, 7, and a vacuum interface 6 at the top of the casing 1, and a discharge outlet 8 on one side of the casing 1.

The propellers and stirring shafts have a hollow structure filled with a heating or cooling medium.

Embodiment 6

A continuous production device for organophosphorus nitrile-catalyzed high-molecular-weight polysiloxane, as illustrated in the sole FIGURE, including: a casing 1, within which there are twin screws 2, 3, multiple feed ports 4, 5, 7, and a vacuum interface 6 at the top of the casing 1, and a discharge outlet 8 on one side of the casing 1.

The casing 1 is internally filled with a heating or cooling medium.

Embodiment 7

A continuous production device for organophosphorus nitrile-catalyzed high-molecular-weight polysiloxane, as illustrated in the sole FIGURE, including: a casing 1, within which there are twin screws 2, 3, multiple feed ports 4, 5, 7, and a vacuum interface 6 at the top of the casing 1, and a discharge outlet 8 on one side of the casing 1.

The twin screws 2, 3 are connected to the motor 9.

Embodiment 8

A continuous production device for organophosphorus nitrile-catalyzed high-molecular-weight polysiloxane, as illustrated in the sole FIGURE, including: a casing 1, within which there are twin screws 2, 3, multiple feed ports 4, 5, 7, and a vacuum interface 6 at the top of the casing 1, and a discharge outlet 8 on one side of the casing 1.

The discharge outlet is composed of multiple conical bodies, with diameters gradually decreasing from the inside out.

The above are only preferred embodiments of the present disclosure and are not intended to limit the disclosure. For those skilled in the art, the present disclosure can be modified and varied in various ways. Any modifications, equivalent replacements, improvements, etc., made within the spirit and principles of the present disclosure should be included within the scope of the present disclosure.

The invention claimed is:

1. A continuous production device for organophosphorus nitrile-catalyzed high-molecular-weight polysiloxane, including: a casing (1) with twin screws (2, 3) inside, multiple feed ports (4, 5, 7) and a vacuum interface (6) at the top of the casing (1), and a discharge outlet (8) on one side of the casing (1); the twin screws (2, 3) are connected to a motor (9);

the twin screws (2, 3) consist of stirring shafts and paddles with helical configurations;

the diameter of the stirring shaft decreases gradually from the first feed port to the discharge outlet, and the corresponding nominal diameter of the paddles increases gradually from the first feed port to the discharge outlet; the paddles and stirring shaft are hollow structures filled with heating or cooling media; the twin screws (2, 3) are arranged in parallel and engage with each other.

2. The continuous production device for organophosphorus nitrile-catalyzed high-molecular-weight polysiloxane according to claim 1, wherein the casing (1) is internally filled with heating or cooling media.

3. The continuous production device for organophosphorus nitrile-catalyzed high-molecular-weight polysiloxane according to claim 1, wherein the discharge outlet consists of multiple conical bodies, with the diameter of the conical bodies gradually decreasing from the inside to the outside.

* * * * *